Patented Oct. 28, 1930

1,779,768

UNITED STATES PATENT OFFICE

EDWARD G. GOODELL, OF STEVENS POINT, WISCONSIN

METHOD OF PROCESSING BLACK LIQUOR AND PRODUCT DERIVED THEREFROM

No Drawing.   Application filed October 26, 1929.   Serial No. 402,802.

This invention relates to a method of processing black liquor and to a product derived therefrom.

In my copending applications, "Process of treating black liquors", Serial No. 329,385, filed December 31, 1928; "Method of dehydrating black liquors", Serial No. 351,660, filed April 1, 1929, and "Process of regenerating black liquors", Serial No. 351,661, filed April 1, 1929, certain processes are described which relate to the recovery and regeneration of the chemical values and the utilization of the heat values contained in the so-called "black liquors" resulting from the manufacture of pulp by the soda or sulphate process or combinations or modifications thereof.

The above applications in particular disclose a process of dehydrating black liquors by spraying the black liquor into a heated gaseous drying medium, such as waste flue gases, wherein removal of the moisture content of the black liquor is effected without decomposition or destruction of its solid organic and inorganic constituents.

The product resulting from my spray drying process, which is claimed herein as a part of my present invention, is a finely divided solid substance, or black liquor residuum, containing all of the organic and inorganic values originally present in the black liquor solution. These values consist principally of the heat content of the organic matter which is separated from the wood or other cellulosic raw material in the process of cooking, and the sodium and sulphur content of the inorganic compounds such as sodium hydroxide, sodium carbonate, sodium sulphate, sodium sulphide, and the like, contained in the cooking liquors.

The steps in my process of reclaiming these values include the generation of steam in standard steam boiler equipment and the smelting or fusion of the sodium compounds in a smelting furnace wherein, in the case of the sulphate process, a high percentage of the sodium sulphur compounds contained in the dried black liquor powder and added thereto as make-up salt cake (sodium sulphate, $Na_2SO_4$) is reduced to the active cooking agent, sodium sulphide.

As described in my copending applications above listed, the dried black liquor powder is delivered to the smelting furnace (usually with an intimate admixture of make-up salt cake) in the same finely divided condition as produced in the spray dryer.

In the commercial scale development of this process, however, I have discovered that a further treatment of the dried black liquor substance may be advantageously employed to improve its physical condition.

It is therefore an object of this invention to provide a product comprising the solid constituents of black liquor containing all of the organic and inorganic values originally present in the black liquor itself.

It is a further important object of this invention to provide a product comprising the solid constituents of black liquor in compressed solid units, or lumps, capable of holding their shape reasonably intact when handled and especially adapted for use in the processing of black liquor to recover the heat values thereof and to recover and regenerate the chemical values contained therein.

It is a further important object of this invention to provide a process of regenerating black liquor in an improved and more efficient manner.

Other and further important objects of this invention will become apparent from the following description and appended claims.

While dried black liquor powder such as may be obtained by the spray process described in my aforementioned copending applications, (either mixed with salt cake or not) may be introduced into the smelting furnace either in a continuous flow or periodically in comparatively large amounts, there frequently results a more or less encrusting or building up into a solid mass in the smelter of large bodies of the dried powder, making necessary more or less manual labor and attention in order to break up this solid or encrusted mass in order to maintain proper circulation of air or gases inside the smelting furnace and otherwise promote furnacing operations. Moreover, when feeding a dry finely divided black liquor powder into the smelting furnace, there is a tendency on the part of some of the powder to float or remain suspended in the air or gases inside the smelting furnace and to burn while in such suspended condition, resulting in a loss of "sodas" in the flue gases in the shape of finely divided particles as dust or in the form of volatilized sodium compounds.

In order to improve these conditions in the smelting furnace I prefer to compress or mold the black liquor solids or residuum into separate solid lump-like shapes and feed such lumps or the like into the smelting furnace in order that a more open or porous bed may be secured, together with improved reducing and smelting conditions and increased furnace capacity.

This method may be employed as a continuous step in compressing or molding black liquor substance just prior to its delivery to the smelting furnace, or it may be employed as a means of converting black liquor substance into a more convenient form for storage, transportation, handling or sale. For example, the smelting furnaces and smelting operations may in certain cases be more advantageously operated at a location apart from the drying operations.

The advantages of this improvement are not limited to the spray drying process, but are also applicable to other methods of treating black liquors. It is not necessary that the black liquor substance be completely dried, nor that it be produced by any particular preliminary method of evaporation, spraying, drying, or concentration, provided the solid constituents of the black liquor are obtained substantially unchanged as to chemical composition. It may be practiced in connection with my spray drying process as aforesaid or it may be practiced in connection with any other method by which black liquor substance is brought to such physical condition that it may be compressed or molded into lumps or shapes possessing sufficient adherence to hold their shape reasonably intact in handling.

In this connection it may be stated that black liquor substance either wholly dried or partially dried or mixed to a plastic consistency is particularly well adapted to this pressing or molding process, being of a viscous adhesive nature, particularly when heated, and may be compressed to an extremely hard dense structure similar to that of bituminous coal. As an indication of the units into which the black liquor substance may be compressed, the weight may be ten to twenty-five pounds or more as may be suited to individual convenience in handling and/or desired results in furnacing.

I am aware that numerous details of the process may be varied through a wide range without departing from the principles of this invention, and I, therefore, do not purpose limiting the patent granted hereon otherwise than necessitated by the prior art.

I claim as my invention:

1. As a new article of manufacture, a solid product consisting of the compressed solid constituents of black liquor substantially unchanged as to chemical composition.

2. As a new article of manufacture, compressed black liquor solids in the form of dense units adapted for handling, storing, transporting and the like.

3. In the process of treating black liquor, the step which comprises compressing the substantially dry solid constituents of black liquor into separate units capable of holding their shapes reasonably intact in handling.

4. In the process of treating black liquor, the step which comprises subjecting the solids of black liquor to a smelting operation while in the form of compressed units.

In testimony whereof I have hereunto subscribed my name at Stevens Point, Portage County, Wisconsin.

EDWARD G. GOODELL.